(12) United States Patent
Kroehling et al.

(10) Patent No.: US 10,382,424 B2
(45) Date of Patent: Aug. 13, 2019

(54) SECRET STORE FOR OAUTH OFFLINE TOKENS

(71) Applicant: Red Hat, Inc., Raleigh, NC (US)

(72) Inventors: Juraci Paixao Kroehling, Munich (DE); Stian Thorgersen, Isdalstø (NO)

(73) Assignee: Redhat, Inc., Raleigh, NC (US)

( * ) Notice: Subject to any disclaimer, the term of this patent is extended or adjusted under 35 U.S.C. 154(b) by 550 days.

(21) Appl. No.: 15/006,629

(22) Filed: Jan. 26, 2016

(65) Prior Publication Data

US 2017/0214683 A1    Jul. 27, 2017

(51) Int. Cl.
*H04L 29/06*    (2006.01)

(52) U.S. Cl.
CPC ...... *H04L 63/0807* (2013.01); *H04L 63/0281* (2013.01); *H04L 63/0435* (2013.01); *H04L 63/061* (2013.01)

(58) Field of Classification Search
CPC combination set(s) only.
See application file for complete search history.

(56) References Cited

U.S. PATENT DOCUMENTS

| | | | |
|---|---|---|---|
| 8,590,014 B1 | 11/2013 | Haugsnes | |
| 8,930,693 B2 | 1/2015 | Holt et al. | |
| 9,270,724 B1 * | 2/2016 | Morgan | H04L 63/0435 |
| 9,673,979 B1 * | 6/2017 | Poole | H04L 9/16 |
| 2005/0125677 A1 * | 6/2005 | Michaelides | H04L 9/321 713/185 |
| 2006/0021017 A1 * | 1/2006 | Hinton | H04L 63/0815 726/10 |
| 2011/0047372 A1 * | 2/2011 | Ganesan | H04L 63/061 713/155 |

(Continued)

FOREIGN PATENT DOCUMENTS

| | | |
|---|---|---|
| WO | 2013/109857 | 7/2013 |
| WO | 2014/005148 | 1/2014 |

OTHER PUBLICATIONS

Weeden et al., "OAuth 2.0 Musings", Jul. 27, 2012, retrieved from https://www-304.ibm.com/connections/blogs/sweeden/entry/oauth_2_0_musings1?lang=en_us (2 pages).

(Continued)

*Primary Examiner* — Phy Anh T Vu
(74) *Attorney, Agent, or Firm* — K&L Gates LLP (57) ABSTRACT

An authentication system includes an authentication server, an application having a proxy, and a token store. The token store receives an authentication request and sends the request to the authentication server. The authentication server authenticates the user based on the request. The token store requests an offline token from the authentication server. The authentication server sends the offline token to the token store. The token store generates a key-secret pair and stores the offline token and the key-secret pair in a database. The token store sends the authentication result of the user to the application. The application receives an authentication result and requests a key-secret pair from the token store. The token store sends the key-secret pair to the application. The key-secret pair is used to configure an agent, which adds the key-secret pair to a communication request sent to the application. The application processes the communication request.

20 Claims, 6 Drawing Sheets

(56) References Cited

U.S. PATENT DOCUMENTS

| | | | |
|---|---|---|---|
| 2011/0078439 A1* | 3/2011 | Mao | H04L 63/126 713/156 |
| 2011/0126296 A1* | 5/2011 | Moore | H04L 63/0807 726/28 |
| 2012/0072979 A1* | 3/2012 | Cha | G06F 21/34 726/7 |
| 2013/0036456 A1* | 2/2013 | Boysen | G06Q 20/04 726/4 |
| 2013/0138957 A1* | 5/2013 | Dharmarajan | H04L 63/0428 713/168 |
| 2014/0201083 A1* | 7/2014 | Nowack | H04L 63/0823 705/51 |
| 2014/0201809 A1* | 7/2014 | Choyi | H04L 63/0807 726/3 |
| 2015/0135302 A1 | 5/2015 | Cohen et al. | |
| 2015/0229628 A1 | 8/2015 | Kosim-Satyaputra et al. | |
| 2015/0249651 A1* | 9/2015 | Okamoto | H04L 63/08 713/171 |
| 2015/0295905 A1* | 10/2015 | Leicher | H04W 12/06 726/4 |
| 2015/0326517 A1* | 11/2015 | Block | H04L 29/06 726/7 |
| 2015/0350179 A1* | 12/2015 | Kobayashi | H04L 63/08 726/4 |
| 2015/0370615 A1* | 12/2015 | Pi-Sunyer | G05B 15/02 700/276 |
| 2016/0134932 A1* | 5/2016 | Karp | H04W 4/80 348/155 |
| 2016/0259936 A1* | 9/2016 | Mukherjee | G06F 21/45 |
| 2017/0006020 A1* | 1/2017 | Falodiya | H04L 63/0815 |
| 2019/0081934 A1* | 3/2019 | Noda | H04L 63/0471 |

OTHER PUBLICATIONS

Weeden et al., "Mobile Demonstration—Under the Hood", Dec. 31, 2011, retrieved from ttps://www-304.ibm.com/connections/blogs/sweeden/entry/mobile_demonstration_under_the_hood?lang=en_us (5 pages).

Lodderstedt et al., "RFC 6819—OAuth 2.0 Threat Model and Security Considerations", Jan. 2013, Deutsche Telekom AG; IBM; Oracle Corporation, retrieved from https://tools.ietf.org/html/rfc6819 (142 pages).

Evans, "Updated Fiddler OAuth Inspector", Mar. 30, 2015, retrieved from http://blogs.msdn.com/b/kaevans/archive/2015/03/30/updated-fiddler-oauth-inspector.aspx (10 pages).

* cited by examiner

SECRET STORE FOR OAUTH OFFLINE TOKENS

BACKGROUND

Computer systems may require applications and agents to be monitored and authenticated before communicating with each other. Authentication may be browser-based authentication or may be basic HTTP authentication that uses a username and password, which is sent to a monitoring application. Some agents may store the username and password information in the machine associated with the agent. This storage is problematic as the storage format may be reversible, which opens a door for an attacker to steal protected user information. Tokens, such as OAuth tokens, may be used to increase security by replacing the username and password information. However, tokens may expire. Once a token expires, an agent may require reconfiguration.

SUMMARY

The present disclosure provides new and innovative systems and methods for authentication using a token store. In an example embodiment, a system includes an authentication server, an application having a proxy and a web interface, and a token store. The authentication server is configured to receive an authentication request of a user from the token store. The authentication request is redirected from a first page on the application to a special path on the token store by the application. The authentication server is further configured to authenticate the user based on the authentication request. The authentication server produces one of a positive authentication result and a negative authentication result upon receiving the authentication request. The authentication server is further configured to receive a request for an offline token from the token store. The authentication server is further configured to send the offline token to the token store upon receiving an offline token request. The application is configured to receive an authentication result from the token store. The application is further configured to request a key-secret pair from the token store. The key-secret pair includes a key and a secret. The application is further configured to receive the key-secret pair from the token store. The user configures an agent using the received key-secret pair such that the agent is adapted to add the key-secret pair to a communication request and send the communication request to the application. The application is further configured to receive the communication request from the agent. The application is further configured to process the communication request. The token store is configured to receive the authentication request. The user is redirected from a first page on the application to a special path on the token store by the application. The token store is further configured to send the authentication request to the authentication server. The token store is further configured to request an offline token from the authentication server. The token store is further configured to receive the offline token from the authentication server. Responsive to receiving the request from the application, the token store is further configured to generate the key-secret pair. The token store is further configured to store the offline token and the key-secret pair in a database. The token store is further configured to send the authentication result of the user to the first page on the application. The token store is further configured to receive the request for the key-secret pair from the token store. The token store is further configured to send the key-secret pair to the application.

In an example embodiment, a method includes receiving, by a token store, an authentication request from a user. The user is redirected from a first page on the application to a specific path on the token store by a application. The method further includes authenticating, by the token store, the authentication request through an authentication server. The method further includes requesting, by the token store, an offline token from the authentication server. The method further includes receiving, by the token store, the offline token from the authentication server. The method further includes generating, by the token store, a random key-secret pair. The key-secret pair includes a key and a secret. The method further includes storing, by the token store, the offline token and the key-secret pair in a database. The method further includes sending, by the token store, the authentication result of the user to the first page on the application.

In an example embodiment, a non-transitory machine readable medium storing code, which when executed by a processor causes the token store to receive an authentication request from a user. The user is redirected from a first page to a specific path on the token store by an application. The machine readable medium further causes the token store to authenticate the user's authentication request through an authentication server. The authentication server produces one of a positive authentication result and a negative authentication result. Responsive to receiving a positive authentication result, the machine readable medium further causes the token store to request an offline token from the authentication server. Responsive to receiving the offline token from the authentication server, the machine readable medium further causes the token store to generate a random key-secret pair. The key-secret pair includes a key and a secret. The machine readable medium further causes the token store to store the offline token and the key-secret pair in a database. The machine readable medium further causes the token store to send the authentication result of the user to the first page on the application.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Techniques are disclosed for providing authentication using a token store for applications (e.g., web applications). In an example embodiment, an authentication system includes an authentication server, a token store, and a machine having an agent that communicate with an application. The authentication system allows a user to configure an agent to access server resources (e.g., through an application hosted by the server) without sharing username and password credentials. For example, the application may include a proxy, which may inject communication requests from the agent to the application with an access token. The access token may be injected into the communication request before the application receives the request. The application may be a monitoring application that is secured by an authorization provider.

Other methods of providing authentication for applications include browser-based authentication and basic HTTP authentication. However, basic HTTP authentication may use a username-password pair to generate an access token. The access token may then be injected into the incoming request. Using a username-password pair, as with current authorization solutions, causes a problem when agents cannot perform a browser-based authentication. For those agents, the solution is to store the username-password pair on the agent's machine. For example, the agents may store the username-password pair in a cleartext format or other reversible format. Storing the username-password pair in a reversible format decreases the security available to the user. For example, if an untrusted application hijacks the username-password pair, the application may impersonate the user and access protected resources that would be accessible to an authenticated user. Storing the username-password pair in a reversible format is problematic, as it reduces security. For example, an attacker may steal the account for the user who owns the machine, which the agent is installed on. Example embodiments of the present disclosure advantageously avoid storing the username-password pair on the agent's machine. Instead, a token store saves a key-secret pair that is associated with an offline token, which is later replaced with an access token, thereby removing any traces of the original user-name password pair and improving security.

Another problem arises in previously existing solutions because tokens, such as OAuth tokens, expire. When a token expires, an agent may need to be reconfigured to work with the newly acquired token, which can be burdensome to the user. An example embodiment of the present disclosure advantageously avoids the problem of reconfiguring the agents by updating the token at a secret store. Updating the token at the secret store enables the key-secret pairs to be used by agents. The key-secret pairs are still valid and may be translated into new tokens transparently. For example, in an example embodiment, a proxy may be used to replace a key-secret pair with an access token. This allows the key-secret pair to be stored safely on client machines where the agent is running because the scope of the key-secret pair is limited (e.g., agent specific). Thus, the security threat is limited to a specific agent instead of all resources available to the username-password pair. In the case of a token leak, the damage to the system would be minimal as it would only affect items accessible by the specific agent. Additionally, in an example embodiment, the tokens may be revoked, which advantageously minimizes any damage in case of leak or data security threat. Once a token is revoked, the key-secret pair becomes useless, and the stolen key-secret pair no longer poses any harm.

Figure 1A:
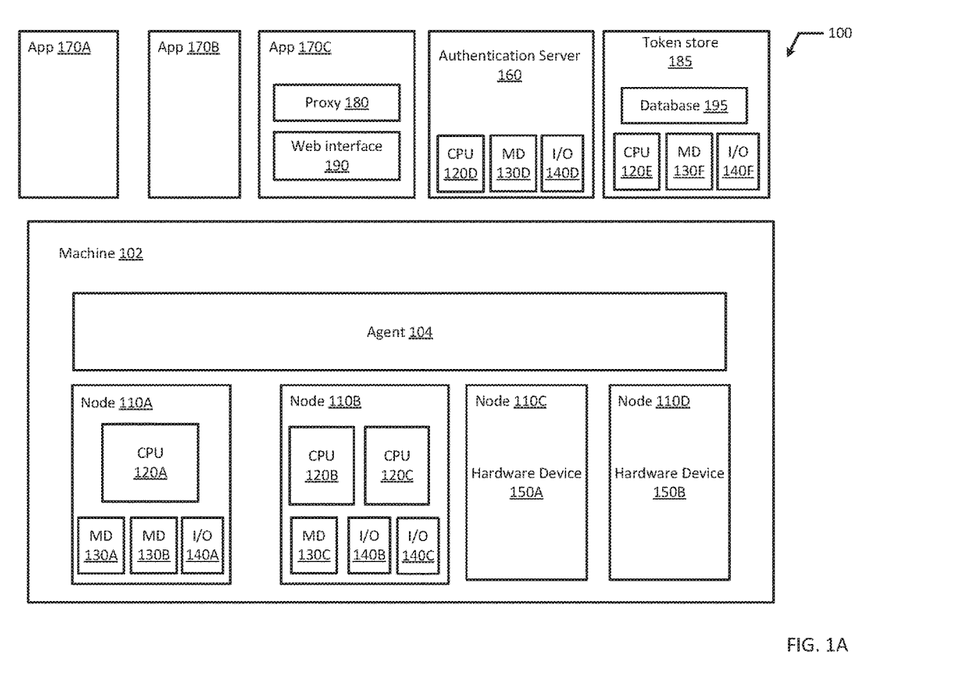
FIG. 1A illustrates a block diagram of an example authentication system using a token store according to an example embodiment of the present disclosure.

FIG. 1A depicts a high-level component diagram of an example authentication system 100 using a token store in accordance with one or more aspects of the present disclosure. The authentication system 100 may include a machine 102. A machine 102 may be a computer, a virtual machine, appliance, other network device, or the like that is capable of communicating with other machines over a network. The machine may have one or more agents (e.g., agent 104) running on the machine 102. For example, the agent 104 may be a process that sends data to an application (e.g., Applications 170A-C). The machine 102 may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 140A-C). Each node 110C-D may include a hardware device 150A-B. In an example embodiment, a hardware device (e.g., 150A-B) may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc.

The authentication system 100 may also include an authentication server 160. The authentication server 160 may in turn include one or more physical processors (e.g., CPU 130D) communicatively coupled to memory devices (e.g., MD 140D) and input/output devices (e.g., I/O 150D). The authentication system 100 may include a token store 185. In an example embodiment, the token store 185 may include a database 195. Additionally, the token store 185 may in turn include one or more physical processors (e.g., CPU 130E) communicatively coupled to a memory device (e.g., MD 140E) and input/output devices (e.g., I/O 150E). The authentication server 160 may be responsible for managing authentication and authorization aspects on behalf of applications (e.g., Applications 170A-C). In an example embodiment, the token store 185 may securely store the combination of a token and a key-secret pair. Additionally, the token store 185 may provide a representational state transfer (REST) based application program interface (API) for managing tokens. For example, the REST based API may allow the token store 185 to communicate using Hypertext Transfer Protocol (HTTP), which may be congruent with the language used by web browses to send and retrieve data.

As used herein, physical processor or processor 130A-D refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 140A-E refers to a volatile or non-volatile memory device, such as RAM, ROM, EEPROM, or any other device capable of storing data. As discussed herein, I/O device 150A-C refers to a device capable of providing an interface between one or more processor pins and an external device capable of inputting and/or outputting binary data.

Processors 130A-D may be interconnected using a variety of techniques, ranging from a point-to-point processor interconnect, to a system area network, such as an Ethernet-based network. Local connections within each node (e.g., application servers 110A-B and authentication server 120), including the connections between a processor 130A-D and a memory device 140A-E may be provided by one or more local buses of suitable architecture, for example, peripheral component interconnect (PCI).

In an example embodiment, one or more applications (e.g., Applications 170A-C) may be deployed in a server. An application 170 may send and receive data to and from machine 102. In an example embodiment, an application 170C may include a proxy 180. The proxy 180 may be responsible for pre-processing all incoming requests to the application 170C. In an example embodiment, the proxy 180 may be distributed and included into an application 170C as a backend component. For example, the proxy 180 may be included as a backend component as a library. If the proxy 180 is distributed as a library, the proxy 180 does not have a single point of failure, which may be disadvantageous. Additionally, a proxy 180 implemented as a backend component allows communication requests to come in directly to the backend, as the proxy 180 is integrated into the application's backend stack. The application 170C may also include a web interface 190.

When an agent 104 needs to communicate with application 170C, the agent 104 may add the key-secret pair 168 to a communication request 172 that it sends to the application 170C. The communication request 172 may be intercepted by the proxy 180. For example, the proxy 180 may intercept a communication request 172 sent by an agent 104 to the application 170C. The proxy 180 may detect whether the communication request 172 includes a key-secret pair 168 or a username-password pair. In an example embodiment, if the communication request 172 includes a username-password pair, the proxy 180 may cease operation. If a key-secret pair 168 is detected, the proxy 180 may query the token store 185 for an offline token. In an example embodiment, the proxy 180 may block the communication request 172 if the secret does not match the stored secret for the provided key. For example, if the token store 185 does not find a token that matches the provided key-secret pair 168 in the communication request, the proxy 180 may block or terminate the communication request 172, which advantageously increases security of the system. For example, an attacker may try to guess possible keys to infiltrate the system, but the attacker would need to correctly guess both the key and secret as described above to prevent the proxy 180 from blocking the communication request 172. After receiving an offline token from the token store 185, the proxy 180 may request an access token (e.g., access token request 174) from the authentication server 160. After the access token 176 is received from the authentication server 160, the proxy 180 may replace the offline token with the access token 176. Then, the proxy 180 may inject the access token 176 into the incoming communication request 172, which may remove all the original authentication data (e.g., key-secret pair 168) from the communication request 172. In an example embodiment, the proxy 180 may employ caching or a similar optimization such that the proxy 180 may not query the authentication server 160 for a new access token. For example, the access token 176 may still be valid at the time the next communication request with the same key-secret pair is intercepted by the proxy 180. Additionally, the proxy 180 may asynchronously request a new access token when the current access token 176 (e.g., cached access token) nears expiration. The proxy 180 may work in the background, which advantageously allows the application 170C to receive updated access tokens 176 without interrupting the user or needing to reconfigure the agent 104. For example, even though the access tokens 176 may expire, the offline token may not expire, which advantageously allows the agent 104 and the application 170C to communicate without the need to reconfigure the agent 104 due to an expired token. Then, the communication reaches the application 170C, and the application 170C may process the requested action from the agent 104. Thus, the application 170C may advantageously process the requested action without receiving the key-secret pair 168 thereby reducing any security threat of the key-secret pair 168 being maliciously used by the application 170C. Furthermore, all remnants of the username-password pair have also been removed, thereby increasing security. In an example embodiment, if an agent 104 is compromised, the key for agent 104 may be revoked. The ability to revoke a key for a specific agent advantageously allows for improved security without the need to refresh the keys for all agents during a security threat.

In an example embodiment, the applications 170A-C, authentication server 160, token store 185, and machine 102 may communicate via a network. For example, the network may be a public network (e.g., the Internet), a private network (e.g., a local area network (LAN) or wide area network (WAN), or a combination thereof. In an example embodiment, authentication server 160 may communicate with the application 170 wirelessly via the Internet, while authentication server 160 may communicate with the token store 185 via an ethernet connection. Additionally, a user may access an application 170 or agent 104 via the Internet. For example, a user may access the web interface 190 of the application 170 by establishing a connection via a network. In an example embodiment, the authentication server 160, the token store 185, and the machine 102 may all communicate wirelessly via the Internet. In another example embodiment, the authentication server 160, the token store 185, and the machine 102 may all communicate via a wired connection. Additionally, the authentication server 160 and the token store 185 may be on the same server.

Figure 1B:
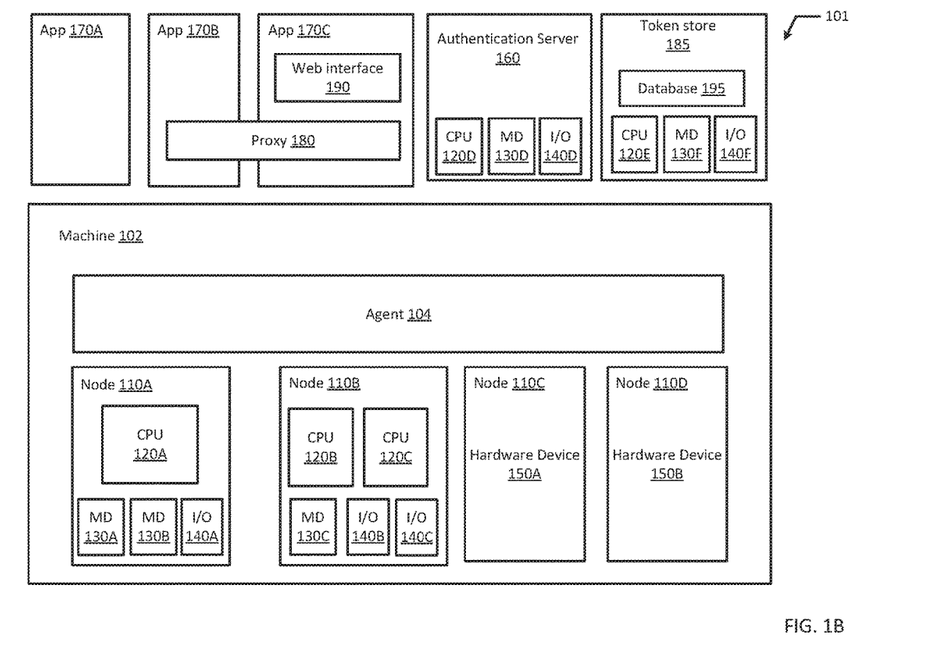
FIG. 1B illustrates a block diagram of an example authentication system using a token store according to an example embodiment of the present disclosure.

FIG. 1B depicts a high-level component diagram of an example authentication system 101 using a token store in accordance with one or more aspects of the present disclosure. The authentication system 101 includes many of the same components as authentication system 100 illustrated in FIG. 1A. The authentication system 101 may include two distinct applications (e.g., Application 170B, Application 170C). For example, application 170B and application 170C may be deployed in two distinct servers. In the illustrated embodiment, application 170B and application 170C may embed the proxy 180 as a library. In another example embodiment, additional applications (e.g., Application 170A) may also embed the proxy 180 as a library. In an example embodiment, application 170A may be deployed in the same server as application 170B, the same server as application 170C, or in its own distinct server. In an example embodiment, the embedded proxy 180 (e.g., proxy embedded on application 170B and application 170C) may communicate with token store 185. For example, each application with a proxy embedded as a library may communicate with the same token store 185. In another example embodiment, the proxy 180 may communicate with token store 185 for communication requests directed to application 170B and the proxy 180 may communicate with a different token store (not pictured) for communication requests directed to application 170C. The proxy 180 may be a backend component, which may allow communication requests to come in directly to the backend. Additionally, the proxy 180 embedded as a library does not have a single point of failure, which may be disadvantageous.

Figure 1C:
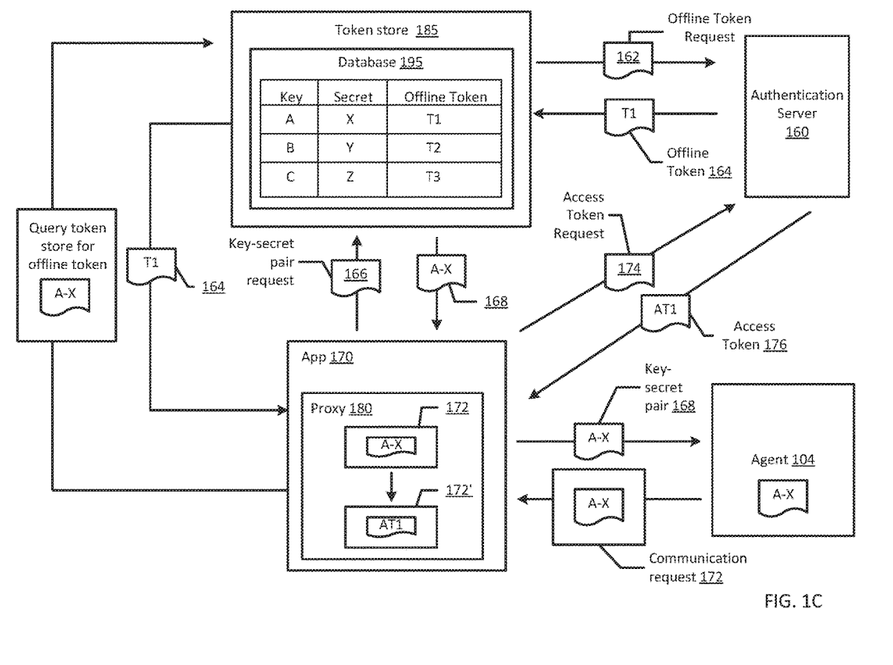
FIG. 1C illustrates a block diagram of an example token store interacting with an authentication server, application, and agent according to an example embodiment of the present disclosure.

FIG. 1C illustrates a block diagram of an example token store 185 interacting with an authentication server 160, application 170, and agent 104 according to an example embodiment of the present disclosure. In an example embodiment, after a user is authenticated by the authentication server 160, the token store 185 may request an offline token (e.g., offline token request 162) from the authentication server 160. Then, the authentication server 160 may send the token store the offline token 164 (e.g., Offline Token "T1"). Then, the token store 185 may generate a random key-secret pair 168 associated with the offline token 164 (e.g., key-secret pair "A-X"). The offline token 164 and the key-secret pair 168 may be stored in database 195 of the token store 185.

A token (e.g., offline token 164, access token 176) may contain security credentials for a user. The token may identify the user, the user's groups, the user's privileges, etc. In an example embodiment, a token may be specific to a particular application 170. For example, application 170A may use a specific token, specific type of token, or specific set of tokens and application 170B may use a different token, a different type of token, or a different set of tokens. Additionally, the token may allow specific permissions. In an example embodiment, the token may hold additional data that can be attached to the token during token creation. A token may include various fields such as an identifier (e.g., logon session identifier, user identifier, group identifier), privileges, owner, etc. For example, a token may be text that can be used in unsecure environments. Tokens may contain the date and time they are issued. Additionally, a token may include an expiration date and time.

A key-secret pair 168 may be generated using any combination of a random number generator (RNG), a pseudo-random number generator (PRNG), the Data Encryption Standard (DES), the Advanced Encryption Standard (AES), the RSA cryptosystem, or the like. Additionally, the key-secret pair 168 may use various key lengths (e.g., 128 bits, 1024 bits, etc.). In an example embodiment, the token store 185 may generate a sufficiently long key length to increase security, as longer keys may take exponentially longer to attack by rendering a brute for attack impractical. An example key may be a string of characters such as "c945f023a084649288be55dg32cbe874d." A secret may be a string of characters of various lengths. An example secret may be "84476b9e526d04b88ccaf3d096532a." The key and secret may also include symbols, special characters, or the like. In an example embodiment, the key may include a prefix, a suffix, or a checksum.

Then, an application may request the key-secret pair 168 (e.g., key secret pair request 166) from the token store 185. The token store may send the application 170 the key-secret pair 168, which may be used to configure an agent 104.

Configuring an agent 104 may include specifying which servers and or resources the agent can trust (e.g., which resources the agent 104 may send and receive data to and from). After the agent 104 is configured with the key-secret pair 168, the agent may add the key-secret pair 168 to a communication request 172 with the Application 170. The application may include a proxy 180, which intercepts the communication request 172. In an example embodiment, the proxy 180 may be embedded as a library across multiple applications. The proxy 180 may query to token store 185 for the offline token 164 associated with the key-secret pair 168 included in the communication request 172. The token store 185 may access database 195 to determine that key-secret pair 168 (e.g., key-secret pair "A-X") is associated with offline token 164 (e.g., offline token "T1"). In an example embodiment, the proxy 180 may block the communication request 172 if the secret does not match the stored secret for the provided key. For example, the proxy 180 may block or terminate the communication request 172 if the token store 185 does not find a token that matches the provided key-secret pair 168 in the communication request, which advantageously increases security of the system. Then, the token store 185 may send the offline token 164 to the proxy 180.

Then, the proxy 180 may request an access token 176 from the authentication server 160 (e.g., access token request 174). The authentication server 160 may send an access token 176 (e.g., access token "AT1") to the proxy 180. The proxy 180 may inject the communication request 172 with the access token 176, which may entirely remove the key-secret pair 168 from the communication request 172 and result in communication request 172'. This process may occur in the background, without the knowledge of the user, agent 104, or application 170.

Figure 2:
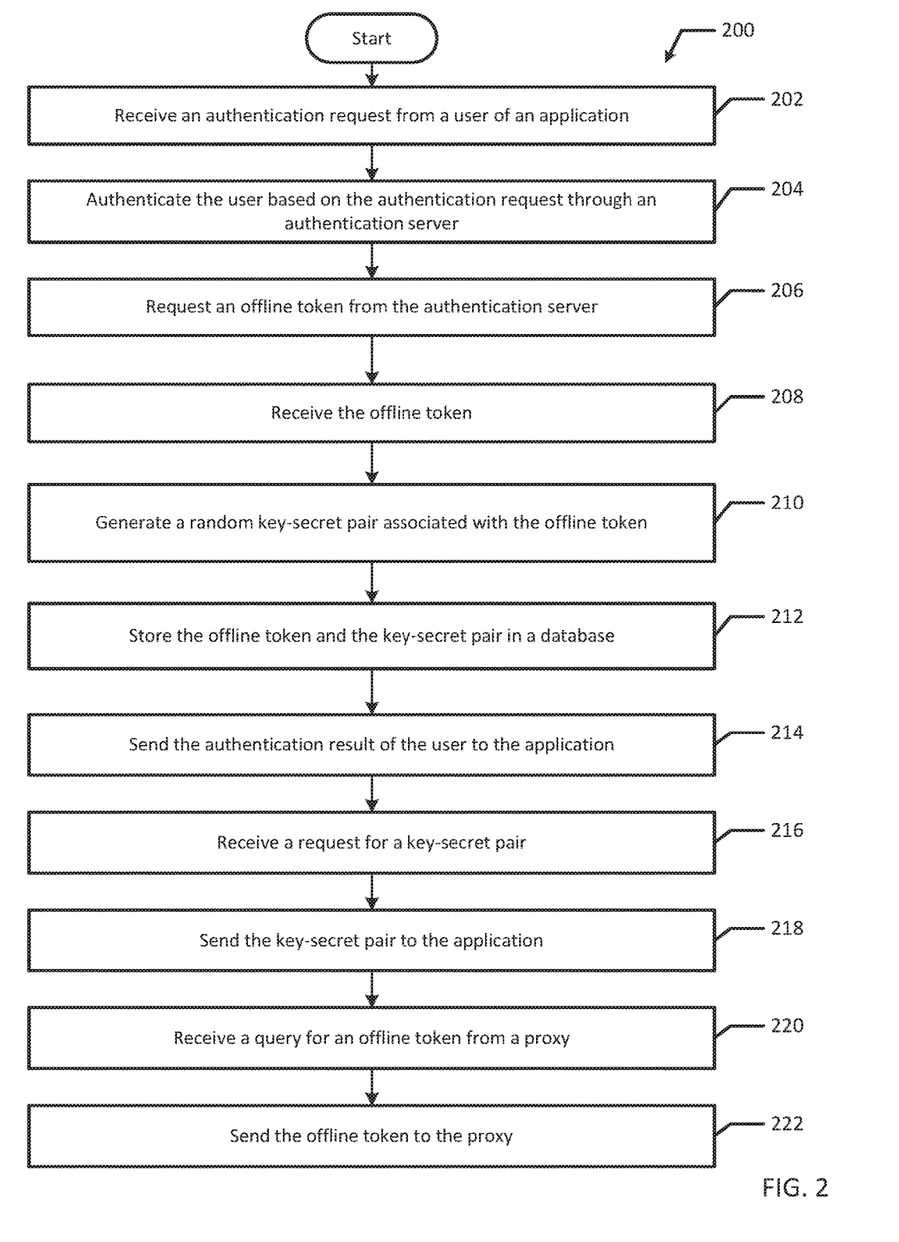
FIG. 2 illustrates a flowchart of an example process for authentication using a token store according to an example embodiment of the present disclosure.

FIG. 2 illustrates a flowchart of an example method 200 for authentication using a token store in accordance with an example embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both.

In the illustrated embodiment, a token store 185 may receive an authentication request from a user of an application 170 (block 202). For example, a user may attempt to login to the application 170 using a username-password pair, and the user may be redirected to a special path, such as a specific URL address, on the token store. In an example embodiment, the user may be directed to the special path upon pressing a login button. The authentication request (e.g., request including the username-password pair) may be received by the token store 185. Then, the token store 185 may authenticate the user based on the authentication request through and authentication server (block 204). In an example embodiment, the token store 185 may send the authentication request to an authentication server 160. For example, the user's username-password pair may be reviewed by the authentication server 160 to determine if the username-password pair can be matched on the authentication server 160. If a match is detected, then the authentication server 160 may authenticate the user and send the positive authentication result to the token store 185. The token store 185 may request an offline token 164 from the authentication server (block 206). In an example embodiment, the token store may send the offline token 164 request along with the authentication request. In another example embodiment, the token store 185 may send the offline token request 162 after the authentication server has confirmed that the user is authenticated. Then, the token store may receive the offline token 164 (block 208). In an example embodiment, the offline token 164 may be received with the authentication result. Additionally, the token may be received in the background. For example, the transfer of tokens between the application 170, the token store 185, and the authentication server 160 may be handled in the background of the agent and/or application without the user's knowledge.

The token store may generate a random key-secret pair 168 associated with the offline token 164 (block 210). The token store may store the offline token 164 and the key-secret pair 168 in a database (block 212). Storing the offline token 164 and the key-secret pair 168, instead of the username-password pair, advantageously allows the user to be authenticated for future requests without having to share his username-password pair credentials. Additionally, the offline token may be revoked, which advantageously minimizes any damage caused by a security breach. The token store 185 may send the authentication result of the user to the application 170 (block 214). In an example embodiment, the token store 185 may send the authentication result to the application 170 once the authentication server 160 authenticates the user. In another example embodiment, the token store 185 may send the authentication result to the application 170 after the offline token 164 is received. In yet another example embodiment, the token store 185 may send the authentication result to the application after the key-secret pair 168 is generated and stored by the token store 185. Then, the token store 185 may receive a request for a key-secret pair 168 (block 216). For example, after receiving a positive authentication result, the application 170 may request the key-secret pair 168 from the token store 185. In response to the application 170 requesting the key-secret pair 168, the token store 185 may receive the key-secret pair request 166. The token store 185 may send the key-secret pair 168 to the application (block 218). In an example embodiment, the application 170 may receive and/or display the key-secret pair 168, which may be used to configure an agent 104. For example, the key-secret pair 168 may be used to specify which applications and resources the agent 104 may access. In another example embodiment, the key-secret pair 168 may be displayed on a web interface 190 so that the user may select and copy the key-secret pair 168 into the agent 104. The agent 104 may then add the key-secret pair 168 to a communication request 172 that is sent to the application 170, which may be intercepted by a proxy 180. The token store 185 may receive a query for an offline token 164 from a proxy 180 (block 220). In an example embodiment, the communication request 172 sent from the agent 104 to the application 170 may be intercepted by a proxy 180. If the proxy 180 detects a key-secret pair 168 in the communication request 172, the proxy 180 may query the token store 185 for the offline token 164. In an example embodiment, the proxy 180 may block the communication request 172 if the secret does not match the stored secret for the provided key. Then, the token store 185 may send the offline token 164 to the proxy (block 222). For example, the token store 185 may match the key-secret pair 168 with the stored offline token 164 associated with the key-secret pair 168. If the token store 185 identifies an associated offline token 164 with the key-secret pair 168 included in the query, the token store 185 may send the offline token 164 to the proxy 180.

Figure 3A:
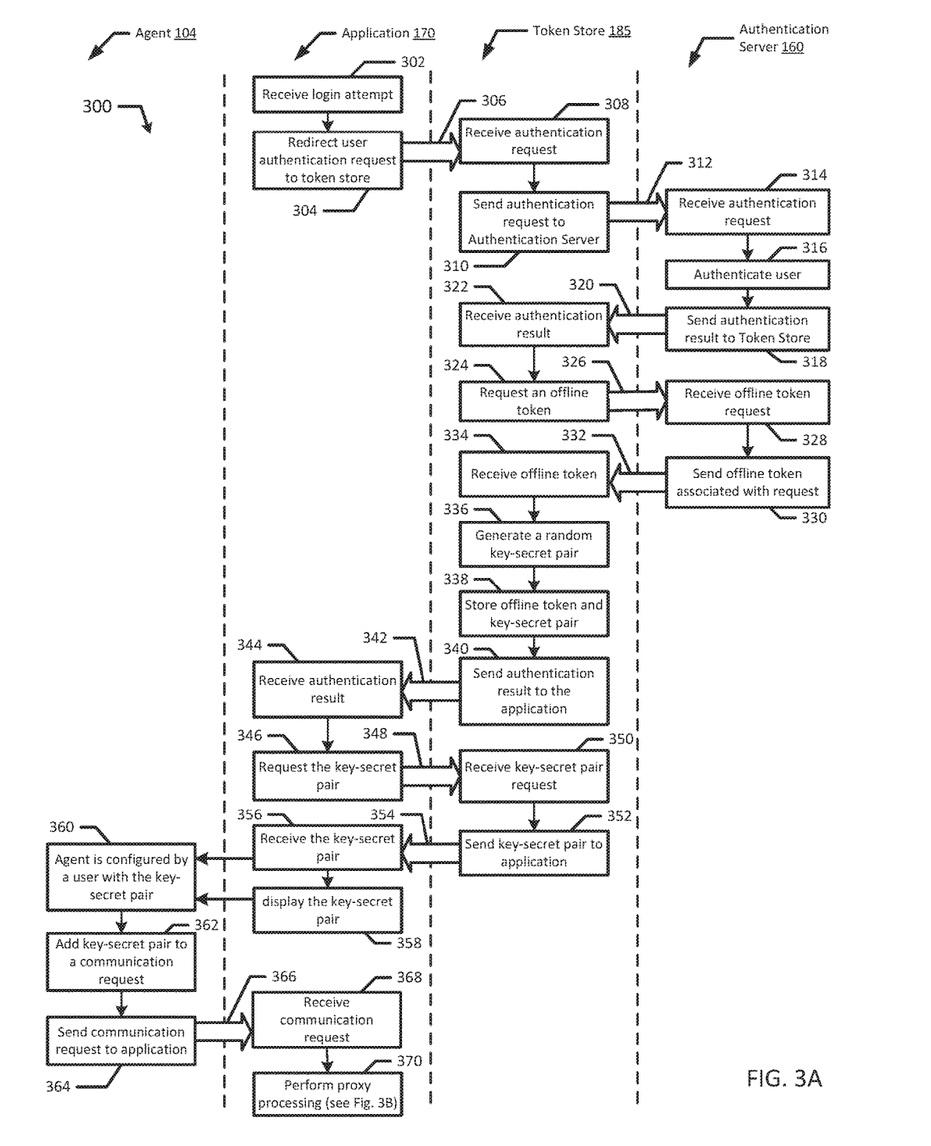
FIGS. 3A and 3B illustrate a flow diagram of an example process for authentication using a token store according to an example embodiment of the present disclosure.
Figure 3B:
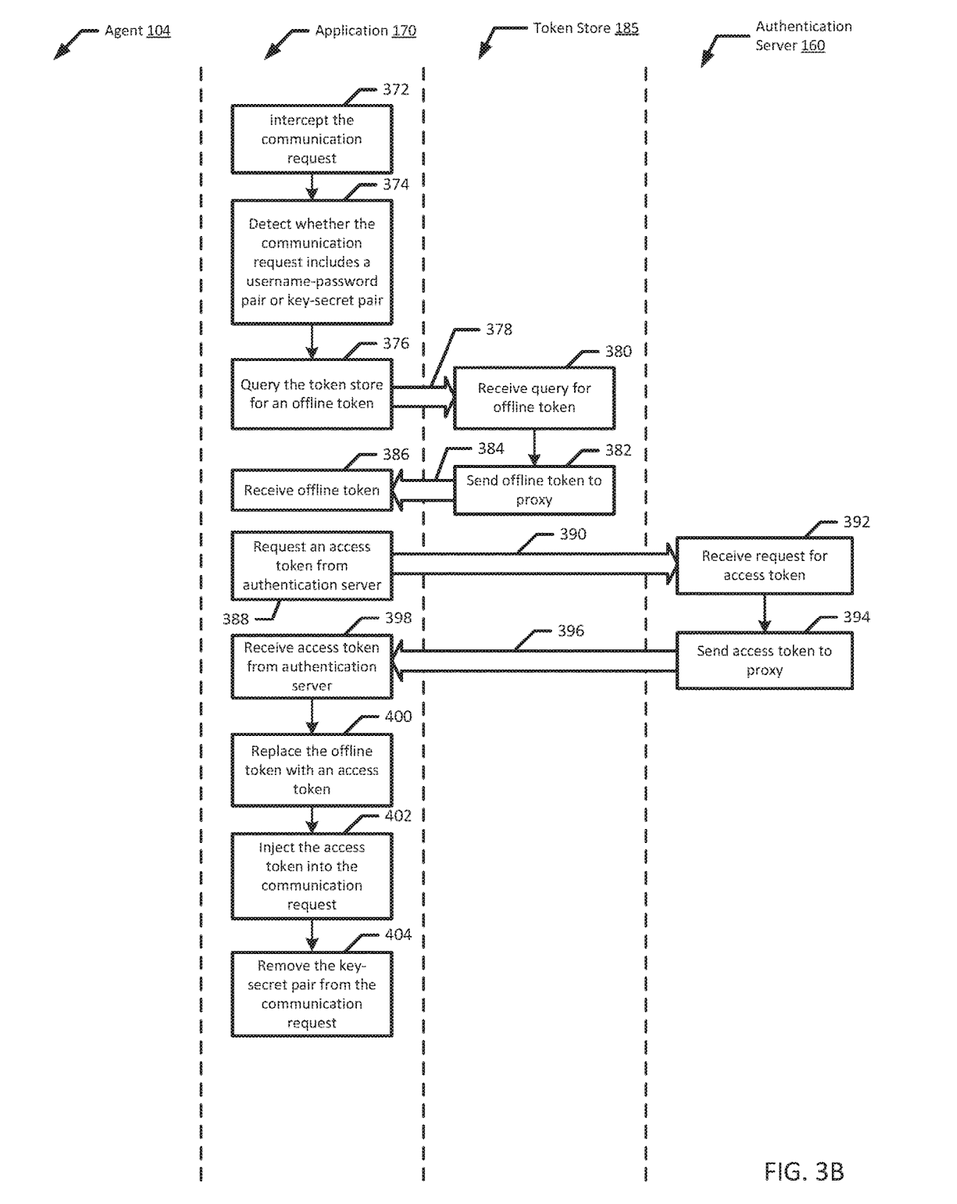

FIGS. 3A and 3B depict a flow diagram illustrating an example method 500 of authentication using a token store according to an example embodiment of the present disclosure. Although the example method 300 is described with reference to the flow diagram illustrated in FIGS. 3A and 3B, it will be appreciated that many other methods of performing the acts associated with the method may be used. For example, the order of some of the blocks may be changed, certain blocks may be combined with other blocks, and some of the blocks described are optional. The method may be performed by processing logic that may comprise (e.g., circuity, dedicated logic, etc.), software, or a combination of both.

In the illustrated example embodiment, an application 170 may receive a login attempt from a user (block 302). For example, a user may attempt to login to the application 170 using a username-password pair. The application 170 may redirect the user authentication request to a token store 185 (blocks 304 and 306). In an example embodiment, the user may be redirected to a special path, such as a specific URL address, on the token store 185. For example, the user may be directed to the special path upon pressing a login button. The token store 185 may receive the authentication request (block 308). For example, the authentication request (e.g., request including the username-password pair) may be received by the token store 185. Then, the token store 185 may send the authentication request to an authentication server 160 (blocks 310 and 312). In an example embodiment, the user may enter the username-password pair at the authentication server 160. The authentication server 160 may receive the authentication request from the token store 185 (block 314). For example, the user's username-password pair may be reviewed by the authentication server 160 to determine if the username-password pair can be matched on the authentication server 160. Then, the authentication server 160 may authenticate the user (block 316). In an example embodiment, the user may be authenticated if a match is found on the authentication server 160. If a match is not found, the user may be prompted to re-enter the username-password pair. The authentication server 160 may send the authentication result to the token store 185 (blocks 318 and 320). Then, the token store 185 may receive the authentication result (block 322). For example, if the token store 185 is notified by the authentication server 160 that the user has been positively authenticated, the token store 185 may continue processing the user's authentication request. In an example embodiment, the token store 185 may redirect the user if the user cannot be authenticated.

Then, the token store 185 may request an offline token 164 from the authentication server (blocks 324 and 326). In an example embodiment, the token store 185 may send the offline token request 162 along with the authentication request. In another example embodiment, the token store 185 may send the offline token request 162 after the authentication server 160 has confirmed that the user is authenticated. Then, the authentication server 160 may receive the offline token request 162 (block 328). Responsive to receiving the offline token request 162, the authentication server 160 may send an offline token 164 associated with the request to the token store 185 (blocks 330 and 332). Responsive to the offline token 164 being sent, the token store 185 may receive the offline token 164 (block 334). In an example embodiment, the offline token 164 may be received with the authentication result. Additionally, the offline token 164 may be received in the background. For example, the transfer of tokens may be handled in the background without the user's knowledge.

Then, the token store 185 may generate a random key-secret pair 168 (block 336). In an example embodiment, the key-secret pair 168 may be generated using various algorithms, standards, and/or number generators. For example, the key-secret pair 168 may be generated using any combination of a random number generator (RNG), a pseudorandom number generator (PRNG), the Data Encryption Standard (DES), the Advanced Encryption Standard (AES), the RSA cryptosystem, or the like. Additionally, the key-secret pair 168 may use various key lengths (e.g., 128 bits, 1024 bits, etc.). In an example embodiment, the token store 185 may generate a sufficiently long key length to increase security, as longer keys may take exponentially longer to attack by rendering a brute for attack impractical. The token store 185 may store the offline token 164 and the key-secret pair 168 (block 338). In an example embodiment, the token store 185 may store the offline token 164 and the key-secret pair 168 in a database 195. The offline token 164 is associated with the key-secret pair 168 such that the database 195 may be parsed for the offline token 164 given the key, the secret and/or the key-secret pair 168. In another example embodiment, the key-secret pair 168 may be stored in database 195 while the associated offline token 164 may be stored in a different database.

The token store 185 may send the authentication result to the application 170 (blocks 340 and 342). In an example embodiment, the token store 185 may send the authentication result to the application 170 once the authentication server 160 authenticates the user. In another example embodiment, the token store 185 may send the authentication result to the application 170 after the offline token 164 is received, in yet another example embodiment, the token store 185 may send the authentication result to the application after the key-secret pair 168 is generated and stored by the token store 185. Responsive to the token store 185 sending the authentication result, the application 170 may receive the authentication result (block 344). Then, the application 170 may request the key-secret pair 168 (blocks 346 and 348). For example, after receiving a positive authentication result, the application 170 may request the key-secret pair 168 from the token store 185. Next, the token store 185 may receive the key-secret pair request 166 (block 350). For example, in response to the application 170 requesting the key-secret pair, the token store 185 may receive the key-secret pair request 166. Then, the token store 185 may send the key-secret pair 168 to the application 170 (blocks 352 and 354). For example, after receiving a positive authentication result, the application 170 may request the key-secret pair 168 from the token store 185. Then, the application 170 may receive the key-secret pair 168 (block 356). The application 170 may display the key-secret pair 168 (block 358). In an example embodiment, the application 170 may receive and may display the key-secret pair 168, which may be used to configure an agent 104. An agent 104 may be configured by a user with the key-secret pair 168 (block 360). In another example embodiment, the key-secret pair 168 may be displayed on a web interface 190 so that the user may select and copy the key-secret pair 168 into the agent 104. In an example embodiment, the application 170 may send the received key-secret pair 168 to the agent 104. In another example embodiment, the application 170 may display the key-secret pair 168 on a web interface 190. For example, the user may view the key-secret pair 168 on the web interface 190 and use the displayed key-secret pair 168 to configure the agent 104. In an example embodiment, the secret of the key-secret pair 168 may not be displayed to a caller (e.g., another screen on the web interface) on a subsequent key-secret pair request 166. Then, the agent 104 may add the key-secret pair 168 to a communication request 172 (block 362). The agent 104 may send the communication request 172 to the application 170 (blocks 364 and 366).

The application 170 may receive the communication request 172 (block 368). Then, the proxy 180 may perform proxy processing (block 370). For example, the proxy 180 may perform several operations on the communication request 172 before it is processed by the application 170. The proxy 180 may intercept the communication request 172 (block 372). For example, the proxy 180 may be configured to intercept all communication requests sent to the application 170. In another example embodiment, the proxy 180 may be configured to intercept a portion of communication requests sent to the application 170. For example, the proxy 180 may intercept communication requests of a certain format or from a specific sender. Then, the proxy 180 may detect whether the communication request 172 includes a username-password pair or a key-secret pair 168 (block 374). In an example embodiment, if a username-password pair is detected, the proxy 180 may cease operation. In an example embodiment, a key-secret pair 166 may include a prefix, a suffix, or a checksum to make it easier for the proxy 180 to differentiate between a key-secret pair and a username-password pair, which advantageously increases the speed by which the proxy 180 can process communication requests. Next, the proxy 180 may query to token store 185 for an offline token 164 (blocks 376 and 378). In an example embodiment, if the proxy 180 detects a key-secret pair 168 in the communication request 172, the proxy 180 may query the token store 185 for the offline token 164 associated with the key-secret pair 168. If the proxy 180 does not detect a key-secret pair 168, the proxy 180 may allow the communication request 172 to pass to the application. In another example embodiment, the proxy 180 may block the communication request 172 if a key-secret pair 168 is not detected. Additionally, the proxy 180 may block the communication request 172 if the secret does not match the stored secret for the provided key. The token store 185 may receive the query for the offline token 164 (block 380). Then, the token store 185 may send the offline token 164 to the proxy 180 (blocks 382 and 384). In an example embodiment, the token store 185 may search the database 195 for the offline token 164 associated with the key-secret pair 168. Once the offline token 164 associated with the key-secret pair 168 (e.g., "T1" associated with "A-X") is located in the database 195 on the token store 185, the token store 185 may send the offline token 164 to the proxy 180. Then, the proxy may receive the offline token 164 (block 386).

The proxy 180 may request an access token 176 from the authentication server 160 (blocks 388 and 390). In an example embodiment, the proxy 180 may request an access token 176 from the authentication server for every communication request 172. In another example embodiment, the proxy 180 may utilize the same access token for a period of time. The authentication server 160 may receive the request for the access token 176 (block 392). In an example embodiment, the authentication server 160 may receive and process the request for the access token 176 while the token store 185 receives the query for the offline token 164. In another example embodiment, the authentication server 160 may receive the request after the proxy 180 has received the offline token 164. The authentication server 160 may send the access token 176 to the proxy 180 (blocks 394 and 396). In an example embodiment, the access token 176 may have the lifespan of a few minutes up to a few hours. In another example embodiment, the access token 176 may have any other lifespan appropriate with the use and application of the token. The proxy 180 may receive the access token 176 from the authentication server 160 (block 398). In an example embodiment, the access token 176 may be used for a specific communication request (e.g., communication request 172). In another example embodiment, the access token may be received for a designated amount of time or for a specific batch of communication requests. In an example embodiment, the proxy 180 may employ caching or a similar optimization such that the proxy 180 may not query the authentication server 160 for a new access token. For example, the access token 176 may still be valid at the time the next communication request with the same key-secret pair is intercepted by the proxy 180. Additionally, the proxy 180 may asynchronously request a new access token when the current access token 176 (e.g., cached access token) nears expiration. Then, the proxy 180 may replace the offline token 164 with the access token 176 (block 400). In an example embodiment, the proxy 180 may have intercepted several communication requests. For example, the proxy may determine which communication request the access token 176 is associated with and then replace the offline token 164 with the proper access token 176. The proxy 180 may inject the access token 176 into the communication request 172 (block 402). In an example embodiment, the proxy may inject the access token 176 immediately. In another example embodiment, the proxy may inject the access token 176 based on the priority of the communication request. In another example embodiment, the access token 176 may be injected at a priority or time specified by additional data attached to the access token 176. For example, the proxy 180 may inject the access token 176 into the communication request 176 after reviewing the access token's privileges, identifier, etc. The proxy may remove the key-secret pair 168 from the communication request 172 (block 404). In an example embodiment, the key-secret pair 168 may be removed and the access token 176 may be injected simultaneously. Once the key-secret pair 168 is removed from the communication request 172, the communication request 172 may be passed to the application 170 without any remnants of the user's username-password pair or the user's key-secret pair, which advantageously improves security by preventing a malicious application from accessing privileged user information.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. Without limiting the following description, in a first example aspect of the present disclosure, includes an authentication server, an application having a proxy and a web interface, and a token store. The authentication server is configured to receive an authentication request of a user from the token store. The authentication request is redirected from a first page on the application to a special path on the token store by the application. The authentication server is further configured to authenticate the user based on the authentication request. The authentication server produces one of a positive authentication result and a negative authentication result upon receiving the authentication request. The authentication server is further configured to receive a request for an offline token from the token store. The authentication server is further configured to send the offline token to the token store upon receiving an offline token request. The application is configured to receive an authentication result from the token store. The application is further configured to request a key-secret pair from the token store. The key-secret pair includes a key and a secret. The application is further configured to receive the key-secret pair from the token store. The user configures an agent using the received key-secret pair such that the agent is adapted to add the key-secret pair to a communication request and send the communication request to the application. The application is further configured to receive the communication request from the agent. The application is further configured to process the communication request. The token store is configured to receive the authentication request. The user is redirected from a first page on the application to a special path on the token store by the application. The token store is further configured to send the authentication request to the authentication server. The token store is further configured to request an offline token from the authentication server. The token store is further configured to receive the offline token from the authentication server. Responsive to receiving the request from the application, the token store is further configured to generate the key-secret pair. The token store is further configured to store the offline token and the key-secret pair in a database. The token store is further configured to send the authentication result of the user to the first page on the application. The token store is further configured to receive the request for the key-secret pair from the token store. The token store is further configured to send the key-secret pair to the application.

In accordance with another example aspect of the present disclosure, which may be used in combination with any one or more of the preceding aspects, the token store is further configured to display the key-secret pair on the web interface, wherein the displayed key-secret pair is used to configure the agent.

In accordance with another example aspect of the present disclosure, which may be used in combination with any one or more of the preceding aspects, the proxy of the application is configured to intercept, the communication request. The proxy is further configured to detect whether the communication request includes a username-password pair or the key-secret pair. The proxy is further configured to query the token store for an offline token. The proxy is further configured to receive the offline token from the token store. The proxy is further configured to request an access token from the authentication server. The proxy is further configured to receive the access token from the authentication server. The proxy is further configured to replace the offline token with the access token. The proxy is further configured to inject the access token into the communication request. The key-secret pair is entirely removed from the communication request upon injecting the access token.

In accordance with another example aspect of the present disclosure, which may be used in combination with any one or more of the preceding aspects, the authentication server and token store are on a single server.

In accordance with another example aspect of the present disclosure, which may be used in combination with any one or more of the preceding aspects, the authentication server and token store are on different servers.

In accordance with another example aspect of the present disclosure, which may be used in combination with any one or more of the preceding aspects, the special path is a specific Uniform Resource Locator (URL).

In accordance with another example aspect of the present disclosure, which may be used in combination with any one or more of the preceding aspects, the key includes at least one of a prefix, a suffix, and a checksum.

In accordance with another example aspect of the present disclosure, which may be used in combination with any one or more of the preceding aspects, the proxy is included in a backend component of the application.

In accordance with another example aspect of the present disclosure, which may be used in combination with any one or more of the preceding aspects, the proxy is a library.

In accordance with another example aspect of the present disclosure, which may be used in combination with any one or more of the preceding aspects, the token store is further configured to revoke the token associated with the key-secret pair.

In a second example aspect of the present disclosure, a method includes receiving, by a token store, an authentication request from a user. The user is redirected from a first page on the application to a specific path on the token store by a application. The method further includes authenticating, by the token store, the authentication request through an authentication server. The method further includes requesting, by the token store, an offline token from the authentication server. The method further includes receiving, by the token store, the offline token from the authentication server. The method further includes generating, by the token store, a random key-secret pair. The key-secret pair includes a key and a secret. The method further includes storing, by the token store, the offline token and the key-secret pair in a database. The method further includes sending, by the token store, the authentication result of the user to the first page on the application.

In accordance with another example aspect of the present disclosure, which may be used in combination with any one or more of the preceding aspects, the method further includes receiving, by the token store, a key-secret pair request from the application. The method further includes sending the key-secret pair to the application.

In accordance with another example aspect of the present disclosure, which may be used in combination with any one or more of the preceding aspects, the method further includes receiving, by the application, at the first page, the authentication result of the user from the token store. The method further includes requesting, by the application, the key-secret pair from the token store. The method further includes receiving, by the application, the key-secret pair from the token store. The user configures an agent using the received key-secret pair such that the agent is adapted to add the key-secret pair to a communication request and send the communication request to the application. The method further includes receiving, by the application, the communication request from the agent. The method further includes processing, by the application, the communication request.

In accordance with another example aspect of the present disclosure, which may be used in combination with any one or more of the preceding aspects, the method further includes displaying the key-secret pair on the web interface. The key-secret pair is used to configure the agent.

In accordance with another example aspect of the present disclosure, which may be used in combination with any one or more of the preceding aspects, the secret of the key-secret pair is not displayed to a caller on a second communication request.

In accordance with another example aspect of the present disclosure, which may be used in combination with any one or more of the preceding aspects, the key-secret pair is added to the communication by the agent as an HTTP basic authentication.

In accordance with another example aspect of the present disclosure, which may be used in combination with any one or more of the preceding aspects, the method further includes revoking, by the application, the key associated with the agent.

In accordance with another example aspect of the present disclosure, which may be used in combination with any one or more of the preceding aspects, the method further includes intercepting, by a proxy, the communication request. The method further includes detecting, by the proxy, whether the communication request includes a username-password pair or the key-secret pair. The method further includes querying, by the proxy, the token store for an offline token. The method further includes receiving, by the proxy, the offline token from the token store. The method further includes requesting, by the proxy, an access token from the authentication server. The method further includes receiving, by the proxy, the access token from the authentication server. The method further includes replacing, by the proxy, the offline token with the access token. The method further includes injecting, by the proxy, the access token into the communication request. The key-secret pair is entirely removed from the communication request upon injecting the access token.

In accordance with another example aspect of the present disclosure, which may be used in combination with any one or more of the preceding aspects, the proxy ceases further operation when the key-secret pair is not detected.

In a third example aspect of the present disclosure, a non-transitory machine readable medium storing code, which when executed by a processor causes the token store to receive an authentication request from a user. The user is redirected from a first page to a specific path on the token store by an application. The machine readable medium further causes the token store to authenticate the user's authentication request through an authentication server. The authentication server produces one of a positive authentication result and a negative authentication result. Responsive to receiving a positive authentication result, the machine readable medium further causes the token store to request an offline token from the authentication server. Responsive to receiving the offline token from the authentication server, the machine readable medium further causes the token store to generate a random key-secret pair. The key-secret pair includes a key and a secret. The machine readable medium further causes the token store to store the offline token and the key-secret pair in a database. The machine readable medium further causes the token store to send the authentication result of the user to the first page on the application.

It should be understood that various changes and modifications to the example embodiments described herein will be apparent to those skilled in the art. Such changes and The invention is claimed as follows:

1. A system comprising:
a hardware authentication server;
an application having a proxy server and a web interface; and
a token store,
wherein the hardware authentication server is configured to:
receive an authentication request of a user from the token store, wherein the authentication request is redirected from a first page on the application to a special path on the token store by the application,
authenticate the user based on the authentication request, wherein the hardware authentication server produces one of a positive authentication result and a negative authentication result upon receiving the authentication request,
receive a request for an offline token from the token store, and
send the offline token to the token store upon receiving an offline token request,
wherein the application is configured to:
receive an authentication result from the token store,
request a key-secret pair from the token store, wherein the key-secret pair includes a key and a secret,
receive the key-secret pair from the token store, wherein the user configures an agent using the received key-secret pair such that the agent is adapted to add the key-secret pair to a communication request and send the communication request to the application,
receive the communication request from the agent, and
process the communication request, and
wherein the token store is configured to:
receive the authentication request, wherein the user is redirected from the first page on the application to the special path on the token store by the application,
send the authentication request to the hardware authentication server,
request the offline token from the hardware authentication server,
receive the offline token from the hardware authentication server,
responsive to receiving the authentication request, generate the key-secret pair,
store the offline token and the key-secret pair in a database,
send the authentication result of the user to the first page on the application,
receive the request for the key-secret pair from the application, and
send the key-secret pair to the application.

2. The system of claim 1, wherein the token store is further configured to display the key-secret pair on the web interface, wherein the displayed key-secret pair is used to configure the agent.

3. The system of claim 1, wherein the proxy server of the application is configured to:
intercept, the communication request;
detect whether the communication request includes a username-password pair or the key-secret pair;
query the token store for the offline token;
receive the offline token from the token store;
request an access token from the hardware authentication server;
receive the access token from the hardware authentication server;
replace the offline token with the access token; and
inject the access token into the communication request, wherein the key-secret pair is entirely removed from the communication request upon injecting the access token.

4. The system of claim 1, wherein the hardware authentication server and the token store are on a single server.

5. The system of claim 1, wherein the special path is a specific Uniform Resource Locator (URL).

6. The system of claim 1, wherein the key includes at least one of a prefix, a suffix, and a checksum.

7. The system of claim 1, wherein the proxy server is included in a backend component of the application.

8. The system of claim 1, wherein the token store is further configured to provide a representational state transfer (REST) application program interface (API).

9. The system of claim 1, wherein the application is further configured to revoke the key from the key-secret pair used to configure the agent.

10. The system of claim 1, wherein the token store is further configured to revoke the offline token that was stored with the key-secret pair.

11. A method comprising:
receiving, by a token store, an authentication request from a user, wherein the user is redirected from a first page on an application to a specific path on the token store by the application;
authenticating, by the token store, the authentication request through a hardware authentication server, wherein the hardware authentication server receives the authentication request from the token store and authenticates the user based on the authentication request, and produces one of a positive authentication result and a negative authentication result upon receiving the authentication request;
requesting, by the token store, an offline token from the hardware authentication server, wherein the authentication server sends the offline token to the token store upon receiving an offline token request;
receiving, by the token store, the offline token from the hardware authentication server;
generating, by the token store, a random key-secret pair, wherein the key-secret pair includes a key and a secret;
storing, by the token store, the offline token and the key-secret pair in a database; and
sending, by the token store, an authentication result of the user to the first page on the application, wherein the application receives the authentication result and requests the key-secret pair from the token store, and wherein an agent is configured using the received key-secret pair such that the agent is adapted to add the key-secret pair to a communication request and send the communication request to the application for processing.

12. The method of claim 11, further comprising:
receiving, by the token store, a key-secret pair request from the application; and
sending the key-secret pair to the application.

13. The method of claim 11, further comprising:
receiving, by the application, the communication request from the agent; and processing, by the application, the communication request.

14. The method of claim 13, further comprising displaying the key-secret pair on a web interface, wherein the displayed key-secret pair is used to configure the agent.

15. The method of claim 14, wherein the secret of the key-secret pair is not displayed to a caller on a second communication request.

16. The method of claim 13, wherein the key-secret pair is added to the communication request by the agent as an HTTP basic authentication.

17. The method of claim 13, further comprising revoking, by the application, the key from the key-secret pair used to configure the agent.

18. The method of claim 13, further comprising:
intercepting, by a proxy server, the communication request;
detecting, by the proxy server, whether the communication request includes a username-password pair or the key-secret pair;
querying, by the proxy server, the token store for an offline token;
receiving, by the proxy server, the offline token from the token store;
requesting, by the proxy server, an access token from the hardware authentication server;
receiving, by the proxy server, the access token from the hardware authentication server;
replacing, by the proxy server, the offline token with the access token; and
injecting, by the proxy server, the access token into the communication request, wherein the key-secret pair is entirely removed from the communication request upon injecting the access token.

19. The method of claim 18, wherein the proxy server ceases further operation when the key-secret pair is not detected.

20. A non-transitory machine readable medium storing code, which when executed by a processor causes a token store to:
receive an authentication request from a user, wherein the user is redirected from a first page to a specific path on the token store by an application;
authenticate the user's authentication request through a hardware authentication server, wherein the hardware authentication server receives the authentication request from the token store and authenticates the user based on the authentication request, and produces one of a positive authentication result and a negative authentication result;
responsive to receiving a positive authentication result, request an offline token from the hardware authentication server, wherein the authentication server sends the offline token to the token store upon receiving an offline token request;
responsive to receiving the offline token from the hardware authentication server, generate a random key-secret pair, wherein the key-secret pair includes a key and a secret;
store the offline token and the key-secret pair in a database; and
send an authentication result of the user to the first page on the application, wherein the application receives the authentication result and requests the key-secret pair from the token store, and wherein an agent is configured using the received key-secret pair such that the agent is adapted to add the key-secret pair to a communication request and send the communication request to the application for processing.

* * * * *